(12) United States Patent
Kassler

(10) Patent No.: US 9,184,833 B2
(45) Date of Patent: Nov. 10, 2015

(54) OPTICAL FIBER TESTING USING OTDR INSTRUMENT

(71) Applicant: Harlan Kassler, Everett, WA (US)

(72) Inventor: Harlan Kassler, Everett, WA (US)

(73) Assignee: Fluke Corporation, Everett, WA (US)

(*) Notice: Subject to any disclaimer, the term of this patent is extended or adjusted under 35 U.S.C. 154(b) by 77 days.

(21) Appl. No.: 14/012,747

(22) Filed: Aug. 28, 2013

(65) Prior Publication Data
US 2015/0062562 A1    Mar. 5, 2015

(51) Int. Cl.
*H04B 10/00* (2013.01)
*H04B 10/071* (2013.01)
*G01M 11/00* (2006.01)

(52) U.S. Cl.
CPC ......... *H04B 10/071* (2013.01); *G01M 11/3136* (2013.01); *G01M 11/3154* (2013.01)

(58) Field of Classification Search
CPC .................................................... H04B 10/071
See application file for complete search history.

(56) References Cited

U.S. PATENT DOCUMENTS

| | | | | | |
|---|---|---|---|---|---|
| 5,321,541 | A * | 6/1994 | Cohen | ............... | H04B 10/038 398/144 |
| 5,506,674 | A * | 4/1996 | Inoue | ............... | G01M 11/3118 356/73.1 |
| 8,213,002 | B2 * | 7/2012 | Kassler | ............... | G01M 11/3145 356/73.1 |
| 8,693,866 | B1 * | 4/2014 | Lam | ............... | H04B 10/071 398/13 |
| 2004/0208501 | A1 * | 10/2004 | Saunders | ............... | H04B 10/0793 398/9 |
| 2005/0259242 | A1 | 11/2005 | Bridge et al. | | |
| 2007/0025676 | A1 * | 2/2007 | Russell | ............. | G01M 11/3136 385/134 |
| 2008/0291431 | A1 * | 11/2008 | Wang | ............. | G01M 11/3136 356/73.1 |
| 2008/0297773 | A1 * | 12/2008 | Blair | ............. | G01M 11/3136 356/73.1 |
| 2009/0268197 | A1 * | 10/2009 | Perron | ............. | G01M 11/3136 356/73.1 |
| 2011/0007996 | A1 * | 1/2011 | Huffman | ............. | G01M 5/0025 385/13 |
| 2011/0153543 | A1 * | 6/2011 | Woodward | ......... | G01M 11/3172 706/54 |
| 2011/0153544 | A1 * | 6/2011 | Nagel | ............. | G01M 11/3136 706/54 |
| 2012/0045205 | A1 * | 2/2012 | Perron | ............. | H04B 10/0795 398/48 |

(Continued)

FOREIGN PATENT DOCUMENTS

| | | |
|---|---|---|
| EP | 1816459 A1 | 8/2007 |
| WO | WO-9525274 A1 | 9/1995 |
| WO | WO-2007009113 A2 | 1/2007 |

OTHER PUBLICATIONS

Extended European Search Report for European Application No. 14182282.5, dated Jan. 30, 2015.

*Primary Examiner* — Danny Leung
(74) *Attorney, Agent, or Firm* — Locke Lord LLP; Scott D. Wofsy; Christopher J. Capelli

(57) ABSTRACT

A method for testing the operation of an optical fiber cable in a communication network using an optical time domain reflectometer (OTDR) instrument includes receiving a range of identifiers of fiber sets to be tested. Identifiers of a first fiber set are displayed. The first fiber set is included in the range and constitutes a next fiber set to be tested. A determination is made whether the first fiber set is connected to the OTDR instrument. In response to determining that the first fiber set is connected to the OTDR instrument, a test of the first fiber set is performed using the OTDR instrument. Identifiers of a second fiber set are displayed. The second fiber set is included in the range and constitutes a next fiber set to be tested.

18 Claims, 5 Drawing Sheets

(56) References Cited

U.S. PATENT DOCUMENTS

| | | | |
|---|---|---|---|
| 2012/0237213 A1* | 9/2012 | Yin | H04L 43/50 398/28 |
| 2014/0071436 A1* | 3/2014 | Cyr | G01N 21/21 356/73.1 |
| 2014/0212131 A1* | 7/2014 | Zhang | H04B 10/0771 398/16 |
| 2015/0062562 A1* | 3/2015 | Kassler | G01M 11/3136 356/73.1 |
| 2015/0124246 A1* | 5/2015 | Collier | G02B 6/46 356/73.1 |

* cited by examiner

OPTICAL FIBER TESTING USING OTDR INSTRUMENT

FIELD OF THE INVENTION

Embodiments of the present invention relate to optical time domain reflectometry, and particularly to optical fiber testing using optical time domain reflectometers.

BACKGROUND OF THE INVENTION

Optical time domain reflectometers (OTDRs) are used in the telecommunications industry for testing, troubleshooting, and characterizing fiber optic cables to measure fiber cabling properties such as breaks, connector loss, splice loss, fiber attenuation, attenuation coefficients, fiber length, and other parameters that affect the signal transmission quality through the cable.

In testing a fiber with an OTDR, optical pulses are launched into the fiber under test from a pulsed laser diode at a low duty cycle. During the time between the optical pulses transmitted, returned light from the fiber under test is reflected back in the form of backscatter and reflections associated with events, such as connectors, and is then converted to an electrical signal, and processed for display. The signal is displayed as an amplitude in decibels versus a length plot showing a gradually decreasing backscatter energy level with reflective events appearing as pulses on the backscatter.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for testing the operation of an optical fiber cable in a communication network using an optical time domain reflectometer (OTDR) instrument includes receiving a range of identifiers of fiber sets to be tested. Identifiers of a first fiber set are displayed. The first fiber set is included in the range and constitutes a next fiber set to be tested. A determination is made whether the first fiber set is connected to the OTDR instrument. In response to determining that the first fiber set is connected to the OTDR instrument, a test of the first fiber set is performed using the OTDR instrument. Identifiers of a second fiber set are displayed. The second fiber set is included in the range and constitutes the next fiber set to be tested.

In another aspect, a computer program product for testing the operation of an optical fiber cable in a communication network using an optical time domain reflectometer (OTDR) instrument is provided. The computer program product includes one or more computer-readable storage devices and a plurality of program instructions stored on at least one of the one or more computer-readable storage devices. The plurality of program instructions includes program instructions to receive a range of identifiers of fiber sets to be tested. Each of the fiber sets includes one or more fibers. The plurality of program instructions further includes program instructions to display identifiers of a first fiber set. The first fiber set is included in the range. The first fiber set comprises a next fiber set to be tested. The plurality of program instructions further includes program instructions to determine whether the first fiber set is connected to the OTDR instrument. The plurality of program instructions further includes program instructions to perform a test of the first fiber set, in response to determining that the first fiber set is connected to the OTDR instrument. The plurality of program instructions further includes program instructions to display identifiers of a second fiber set. The second fiber set is included in the range. The second fiber set constitutes the next fiber set to be tested.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
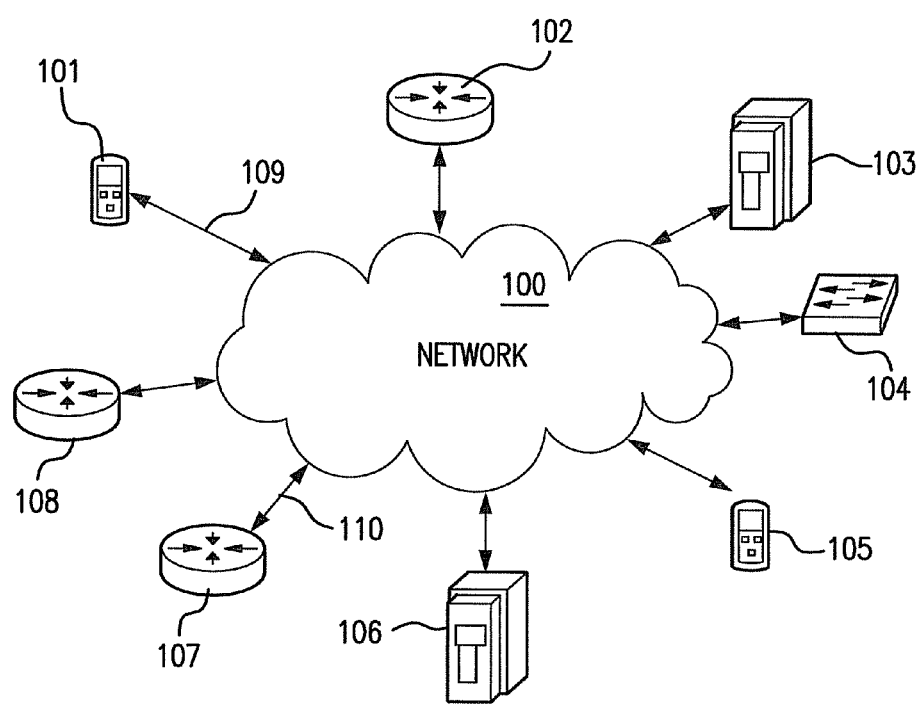
FIG. 1 illustrates an example communication network in accordance with an illustrated embodiment.

The present invention is now described more fully with reference to the accompanying drawings, in which illustrated embodiments of the present invention is shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may differ from the actual publication dates which may need to be independently confirmed.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims.

In the context of this specification, an OTDR backscatter trace "event" refers to a change in the backscatter signal as a function of distance along the fiber caused by any physical phenomenon or combination of physical phenomena, such as reflection or attenuation. The said physical phenomenon or phenomena causing such "event" in the OTDR trace will be referred to herein as an "event feature".

The method according to a preferred embodiment of the present invention preferably comprises a palm-sized test instrument based on OTDR technology for testing optical fibers in optical networks. It will be understood that many variants of OTDR devices exist and various embodiments of the present invention are not in any way restricted to any specific OTDR device. The instrument can measure the length of a fiber, the distance to a fiber break, and may detect live traffic. The instrument may be used to test for connectivity and network problems. The tester instrument operates by automatically making three measurements. First, using a photodetector it measures the power on the fiber under test to determine if the fiber is "live." Secondly, it preferably makes quick coarse measurements of the fiber length and backscatter. From these measurements, the tester instrument preferably determines optimal test parameters and makes the final measurements. Advantageously, the OTDR test instrument described herein enables a user to control the test of fiber sets, each set comprising one or more fibers, by reconnecting the OTDR instrument to a plurality of fibers without any direct interaction with the OTDR instrument between each test.

A communication network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an exemplary communication network 100 illustratively comprising nodes/devices 101-108 (e.g., mobile devices, servers, routers, wireless stations, and the like) interconnected by various methods of communication. For instance, the link 109 may comprise a wireless communication medium, where certain nodes are in communication with other nodes, e.g., based on distance, signal strength, current operational status, location, etc. Moreover, each of the devices can communicate data packets (or frames) with other devices using predefined network communication protocols as will be appreciated by those skilled in the art, such as various wired protocols and wireless protocols etc., where appropriate. In this context, a protocol consists of a set of rules defining how the nodes interact with each other.

According to an embodiment of the present invention, the exemplary communication network 100 may include one or more fiber optic links 110. The fiber optic link 110 may be connected to an optical transceiver 107 on both ends for translating the transmitted optical signals into electrical signals. The optical transceivers 107 may be, for example, but not limited to, Small Form Factor Pluggable (SFP) modules.

Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

Figure 2A:
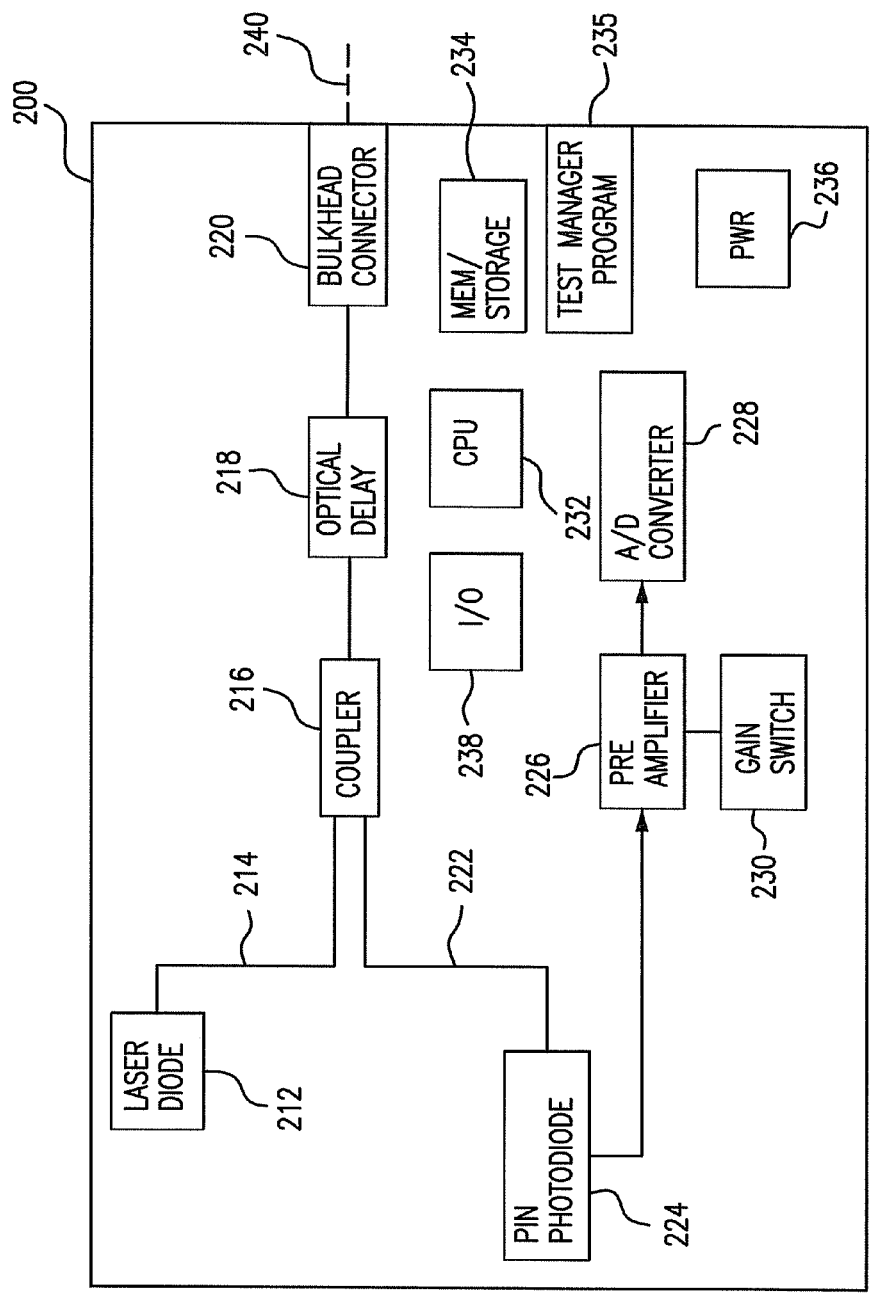
FIG. 2A is an optical topology block diagram of an OTDR instrument in accordance with an embodiment of the present invention.

Referring to FIG. 2A, an optical topology block diagram of an OTDR instrument 200 is shown in accordance with an embodiment of the present invention. The OTDR instrument 200 is designed for examining and testing optical fibers in telecommunication systems, such as short range telecommunication systems. In order to detect a problem such as an open in the network, the OTDR instrument 200 may be configured to work in both the backscatter and reflection finding modes. According to an embodiment of the present invention, the optical topology shown in FIG. 1 may comprise a variable width pulsed optical source 212 coupled by an optical fiber 214 to a coupler 216 whose output fiber may be an optical delay 218, which may be terminated at the bulkhead connector 220. The optical coupler 216 may have the second output port terminated via fiber 222 to an Avalanche PhotoDetector (APD) 224. The APD 224 operates as an optical detector to convert the reflected light to electrical energy which is supplied to and then amplified by the operational amplifier 226 (pre-amplifier) whose gain can be varied from a high to a low state (by operation of gain switch 230) used for either detecting backscattering or reflections without backscattering. An analog to digital converter 228 may transform the analog signal to a digital signal that may then be signal averaged to improve the signal to noise ratio.

One or more microprocessor(s) (CPU 232) may comprise hardware elements or hardware logic adapted to execute the software programs and manipulate the data structures. The one or more microprocessor(s) 232 may execute, for example, a test manager program 235, which may be stored in the memory/storage 234, to control operation of the OTDR instrument 200. The test manager program 235 may comprise program instructions stored on one or more computer-readable storage devices, which may include internal storage 234 of the OTDR instrument 200. The test manager program 235 may be, for example, a computer program or program component for controlling tests performed by the OTDR instrument 200. Data gathered, generated, and maintained for use by the test manager program 235 may be kept in the internal storage 234 of the OTDR instrument 200. A power block 236 may provide the power source to operate the OTDR instrument 200, suitably battery power for portably hand-held use. I/O 238 may provide one or more interfaces with the user of the OTDR instrument 200, and may include a display and input devices, such as cursor control keys and other keys for allowing user operation and display/output of results (shown in FIG. 2B).

Figure 2B:
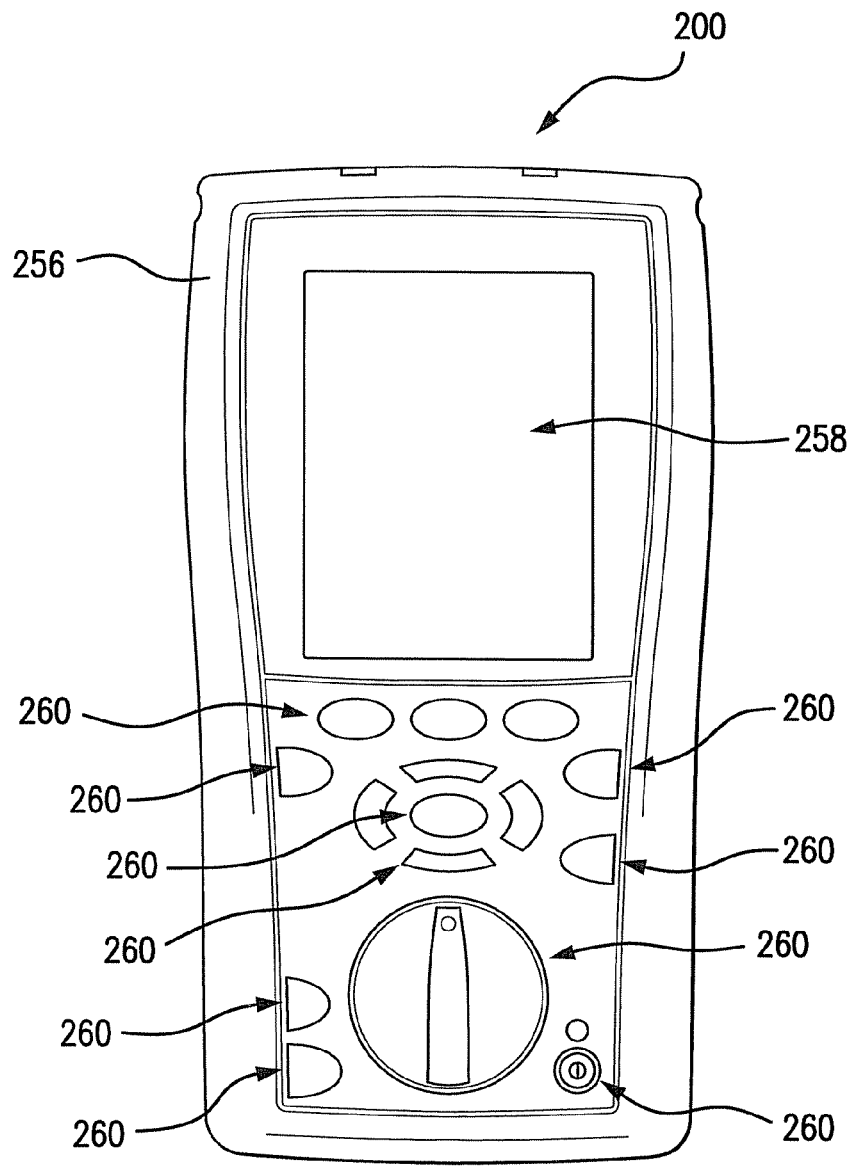
FIG. 2B illustrates external components of the OTDR instrument of FIG. 2A in accordance with an embodiment of the present invention.

Referring to FIG. 2B, external components of the OTDR instrument 200 of FIG. 2A are illustrated in accordance with an embodiment of the present invention. The OTDR instrument 200 may be suitably provided in a hand-held form, as shown in FIG. 2B. According to an embodiment of the present invention, the OTDR test instrument 200 may comprise a case 256 sized for holding in a user's hand, a display 258, and a plurality of user input controls 260, which may comprise, for example, but not limited to, cursor control keys, buttons, selector knobs, and the like.

Figure 3:
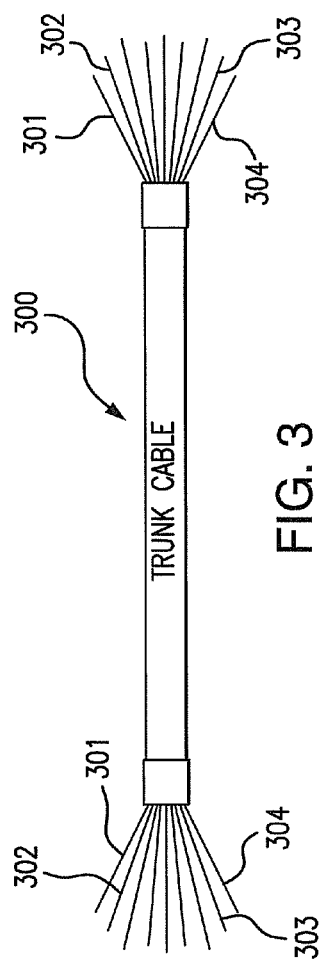
FIG. 3 illustrates a side view of an exemplary fiber optic trunk cable in accordance with an embodiment of the present invention.

Referring now to FIG. 3, an exemplary fiber optic trunk cable, designated broadly at 300, is illustrated. The trunk cable 300 may be used, for example, as the fiber optic link 110 in the exemplary network 100 of FIG. 1. The trunk cable 300 includes a plurality of optical fibers (some of which are shown in FIG. 3), and may include terminals (not shown) at the opposite end of the fibers. As can be seen in FIG. 3, the fibers 301-304 may be arranged such that they form a plurality of sets. For example, adjacent fibers 301 and 302 may comprise a first set, adjacent fibers 303 and 304 may comprise a second set, and so forth. Alternatively, one or more of these sets may include only one fiber. The plurality of fibers may be arranged in any pattern known in the art.

According to one embodiment of the present invention, each fiber 301-304 may have a corresponding identifier, such as a signature, associated with it. For example, one known method of identifying each of the plurality of fibers 301-304 involves launching light into each of the fibers 301-304 from the OTDR instrument 200 and obtaining a plurality of OTDR traces having different signatures applied thereto by means of a respective one of a plurality of signature applying means connected to opposite ends, respectively, of the fibers 301-304, each of the fibers being identifiable by detecting its signature in the corresponding OTDR trace. In various embodiments, each signature may comprise an OTDR trace event caused by a physical phenomenon or combination of phenomena along the fiber. Each of the signatures may be applied to the respective one of the said plurality of fibers 301-304 by generating at least two backscatter events spaced apart from each other by a predetermined effective optical distance that is different from the predetermined distance between the at least two backscatter events of other signatures.

Alternatively, each of the signatures may be applied to the respective one of the said traces by amplitude modulation of at least one event, such that the event amplitude differs from one fiber signature to another. The amplitude modulation may be provided by an event feature producing a predetermined change in value of a loss, attenuation or reflectance.

Figure 4:
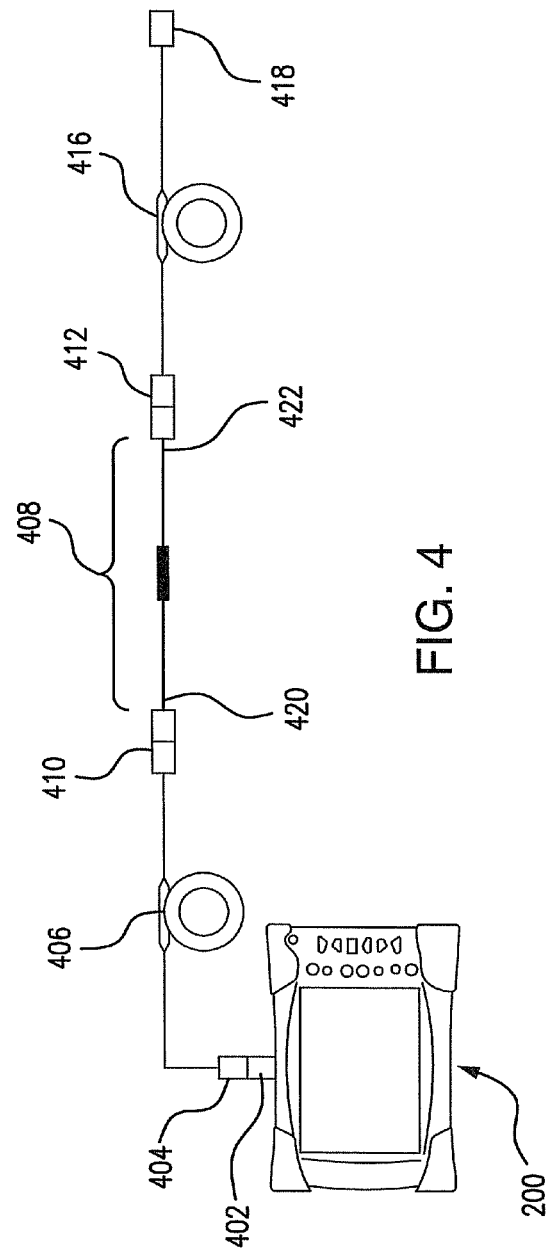
FIG. 4 is a diagram illustrating a connection arrangement for attaching the OTDR instrument of FIG. 2A to an optical fiber link under test in accordance with an embodiment of the present invention.

FIG. 4 is a diagram illustrating a connection arrangement for attaching the OTDR instrument 200 to an optical fiber link under test (OFLUT) in accordance with an embodiment of the present invention. The OTDR instrument 200 can be used to characterize an OFLUT. In an embodiment of the present invention, the OTDR instrument 200 can provide total loss, length and return loss of a fiber, as well as localize loss and reflectance at each joint (splice or connector). In order to characterize the input and output connectors of an OFLUT, it is usual to add a proper lead-in fiber (hereinafter referred to as a "launch fiber") and a termination fiber (hereinafter referred to as a "receive" fiber) in order to provide a reference backscattering level before and after each connector. It is noted that there are two methods well-known in the art that may be used to measure loss, which are typically called "single-ended loss" and "double-ended loss". The single-ended loss method uses only the launch fiber, while the double-ended loss method uses a receive fiber attached to the OFLUT also. Various embodiments of the present invention are not limited to the single-ended loss and double-ended loss methods and contemplate other methods that may include, for example, omitting the launch fiber, using hybrid connector patch cables connected to the OFLUTs, and the like.

When the single-ended loss method is used for testing, the OTDR instrument 200 is connected to each OFLUT in turn using a single launch fiber, while the distal end of each of the fibers-under-test OFLUTs remains disconnected.

An alternative known approach is the double-ended loss testing method. The double-ended loss testing method involves connecting the OTDR instrument 200 to each OFLUT in turn using a single launch fiber, while the distal end of each of the OFLUT is connected to a respective receive fiber. Referring back to FIG. 4, the connection arrangement is illustrated when the double-ended loss testing method is used. As shown in FIG. 4, both launch 406 and receive 416 fibers have been employed at the near end 420 and the remote end 422, respectively, of the OFLUT 408 that is being tested. The OFLUT 408 may comprise a pair of fibers (e.g., adjacent fibers 301 and 302 shown in FIG. 3). The launch fiber 406, which connects the OTDR instrument 200 to the OFLUT 408, is used to disclose the insertion loss and reflectance of the near-end connection 420. The receive fiber 416, which is connected to the far-end 422 of the OFLUT 408 is used to expose the insertion loss and reflectance of the far-end connection 422.

By employing both the launch 406 and the receive 416 fibers, as shown in FIG. 4, the OTDR instrument 200 determines a total insertion loss of the OFLUT 408. The launch fiber 406 may be connected to an OTDR port 402 of the OTDR instrument 200 using any suitable type of standardized fiber optic connector 404. The standardized fiber optic connectors include, but not limited to, SC, ST, LC, FC, and MTRJ styles. The connector 404 may have a push-pull latching mechanism to allow easy insertion and removal and to ensure a positive connection.

The reflection from the end connector 418 of the receiver fiber 416, whether arising from the approximately 4% Fresnel reflection at a perpendicularly-cleaved glass-air interface or from some explicit reflective element (e.g. end mirror, broadband Bragg reflector, etc.), typically yields a clearly visible peak on the OTDR trace. The detection of a reflectance event at the distal end of the OFLUT 408, yielding a peak on the OTDR trace, provides an important reference point for calculating the end 418 of the receive fiber 416.

Figure 5:
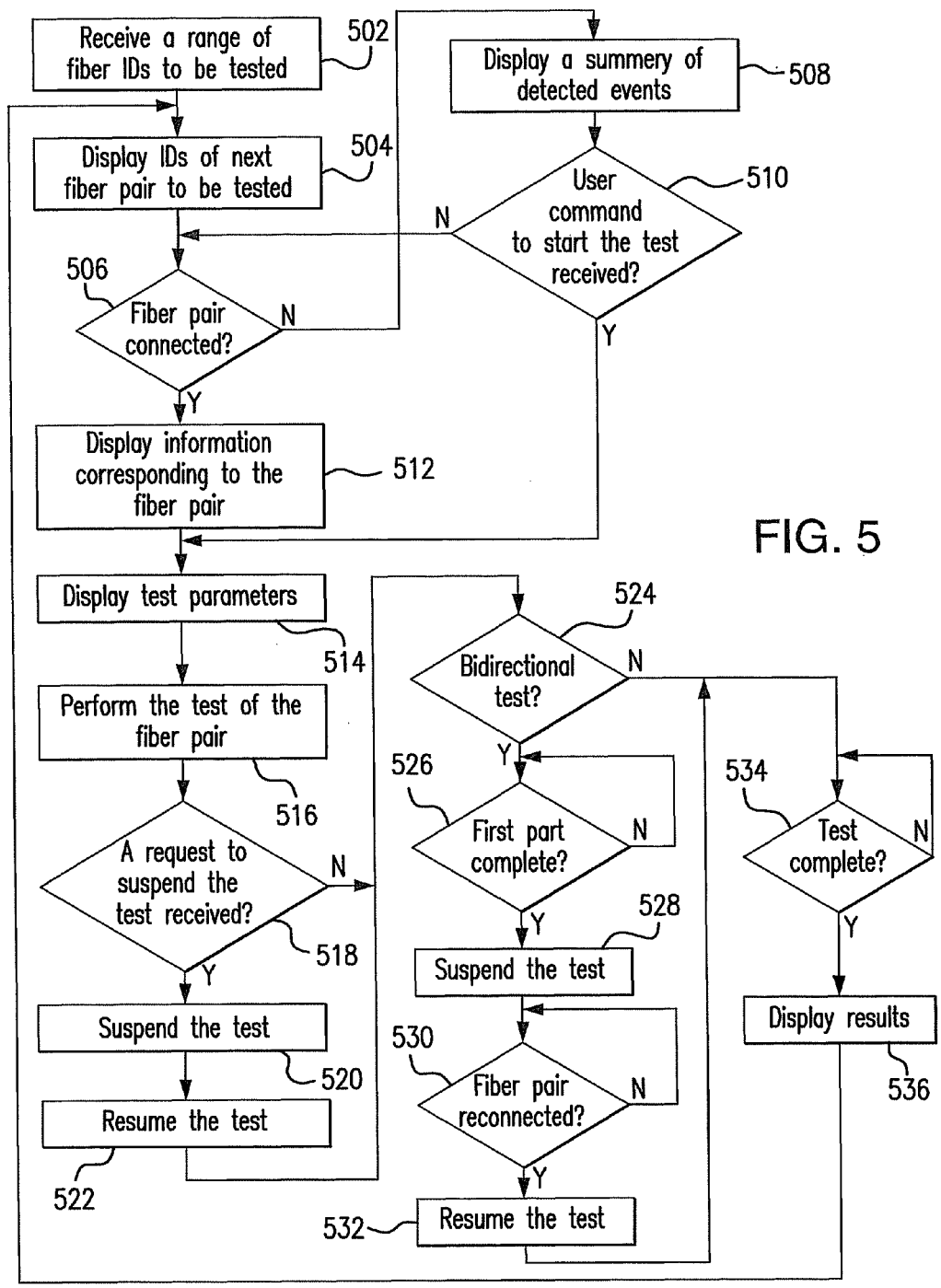
FIG. 5 is a flowchart of operational steps of the test manager program of FIG. 2A in accordance with an illustrative embodiment of the present invention.

FIG. 5 is a flowchart of operational steps of the test manager program 235 of FIG. 2A in accordance with an illustrative embodiment of the present invention. At step 502, the test manager program 235 preferably receives a range of identifiers of fiber sets to be tested. In various embodiments, the fiber set may comprise a single fiber, a fiber pair, or a plurality of fibers, each of which may be separated by a lead-in fiber that is not part of the OFLUT. The lead-in fiber may be similar to the launch fiber 406. During the test setup, a user preferably enters a plurality of identifiers corresponding to a plurality of fiber sets contained in a trunk fiber optic cable, such as the fiber optic cable 300 (shown in FIG. 3). The user preferably enters the identifiers by employing, for example, the plurality of user input controls 260 of the OTDR tool 200. The user may specify the number of fibers to test by various means, including, but not limited to, numeric entry, testing with just the launch fiber 406, receive fiber 416, and/or other lead-in fibers. Alternatively, a list of the fiber identifiers, received at step 502, may comprise a list of fiber sets that failed during previously run tests, assuming the OTDR tool 200 is configured to retest the failed fibers.

At step 504, the test manager program 235 preferably sorts the received identifiers and indicates to the user the next fiber set to be tested by displaying the corresponding identifier on the display 258 of the OTDR tool 200. For example, the test manager program 235 indicates that a first fiber, for example, fiber 301, may be tested next. In other words, fiber 301 comprises the next OFLUT 408. In response, the user attempts to connect the OTDR tool 200 to the first fiber (OFLUT 408). As previously indicated, if the double-ended loss method of testing is used, the user may employ both launch 406 and receive 416 fibers, as shown in FIG. 4.

At step 506, the test manager program 235 preferably determines whether the OFLUT 408 has been connected to the OTDR tool 200. In an embodiment of the present invention, in order to detect whether the OFLUT 408 has been connected, the test manager program 235 preferably instructs the OTDR tool 200 to send a plurality of quick probe optical pulses. It is to be noted that the number of pulses that is used may depends on the OFLUT 408 (e.g., only one pulse may be sufficient for a short link, while many pulses may be required for a long link). The optical pulses are preferably launched into the OFLUT 408 from the optical source 212 (e.g., a laser diode) of the OTDR tool 200. While waiting for the fiber to be fully connected (step 506, no branch), the test manager program 235 may display a summary of various events detected (if any) along the OFLUT 408. In response to determining that the OFLUT 408 has been connected (step 506, "yes" branch), at step 512, the test manager program 235 preferably displays information pertaining to the OFLUT 408 via the display 258 of the OTDR tool 200. In an embodiment of the present invention, such information may include, for example, but not limited to, information about poor connections along the connection arrangement, such as the arrangement shown in FIG. 4.

It is noted that in some cases the OTDR tool 200 may have difficulty detecting both the launch 406 and receive 416 fibers. Accordingly, the user may have an option of starting the test manually. In an embodiment of the present invention, the user may start the test by pressing one of the user input controls 260. As a result, a user interface of the OTDR tool 200 may generate a corresponding start command, which may be sent to the test manager program 235. At step 510, the test manager program 235 may check whether the start command has been received. In response to determining that the start command has not been received (step 510, "no" branch), the test manager program may continue its attempts to detect the full connection of the first fiber (at step 506).

At step 514, after displaying the information pertaining to the connected OFLUT 408 (at step 512) or in response to receiving the manual start command from the user (step 510, "yes" branch), the test manager program 235 may display various test parameters characterizing the test to be run. These parameters may have been pre-configured by the user. In various embodiments of the present invention, the test manager program 235 may present the test parameters to the user via the display 258.

Next, at step 516, the test manager program 235 preferably conducts the OTDR test of the OFLUT 408 in accordance with the aforementioned test parameters. It should be noted that a full test may take a relatively long time to complete (e.g., without limitation, from approximately 4 minutes to approximately 6 minutes). Accordingly, in some situations, the user may want to stop the test. For example, if at step 514 the test manager program 235 has identified one or more poor connections, the user may be interested in correcting the connection before the completion of the test. Thus, according to an embodiment of the present invention, at step 518, the test manager program 235 preferably checks whether a request to suspend the test has been received from the user. Again, the user may utilize one or more of the user input controls 260, illustrated in FIG. 2B, to suspend the running test. In response to determining that such request has been received (step 518, "yes" branch), at step 520, the test manager program 235 may suspend the test of the first fiber. After the user corrects the connections and/or after another request indicating his or her desire to continue the test is received, the test manager program 235, at step 522, preferably resumes the test of the OFLUT 408. In an alternative embodiment of the present invention, rather than suspending the test, the test manager program 235 may determine whether the OFLUT 408 has been connected to the OTDR tool 200 and may display the information pertaining to the connected OFLUT 408, as described above for steps 506 through 514.

At step 524, the test manager program 235 preferably examines the aforementioned test parameters in order to determine whether the user is interested in running a bidirectional OTDR test. It is noted that, while they may not always be the most practical, bidirectional average of OTDR loss measurements provide an accurate method of measuring individual loss. Therefore, in order to obtain the accurate results the user may be interested in the bidirectional test. In response to determining that the bidirectional test should be run (step 524, "yes" branch), the test manager program 235 preferably continuously checks whether the first part of the bidirectional test is complete, at step 526. According to an embodiment of the present invention, the first part of the bidirectional test may comprise testing the OFLUT 408 in one direction only. Once the first part of the bidirectional test is complete (step 526, "yes" branch), the test manager program 235 preferably suspends the test at step 528 and prompts the user to switch the launch 406 and receive 416 fibers in order to test the reverse direction of the OFLUT 408. In other words, continuing with the exemplary connection arrangement illustrated in FIG. 4, to perform the second part of the bidirectional test, the user should connect the launch fiber 406 to the second connector 412 at the far end 422 of the OFLUT 408 and should connect the receive fiber 416 to the first connector 410 at the near end 420 of the OFLUT 408. Just like in the first part of the test, the OTDR tool 200 should be connected to the launch fiber 406. Accordingly, at step 530, the test manager program 235 preferably checks whether the OFLUT 408 has been reconnected to the same overall length in the opposite direction. Alternatively, the OTDR tool 200 may be disconnected from the launch fiber 406 at the connector 404 and connected to the receive fiber 416 at the connector 418. Step 530 may also display a summary of detected events and check for a user command to resume the test, by the above-described process steps 506 through 514. At step 532, the test manager program 235 preferably resumes the bidirectional test, in response to determining that the OFLUT 408 has been reconnected (step 530, "yes" branch). According to an embodiment of the present invention, prior to resuming the bidirectional test, the test manager program 235 preferably verifies that the fiber events associated with the reverse direction align properly with the results of the first part of the test.

Next, at step 534, the test manager program 235 preferably determines whether the test of the first fiber is complete. It should be noted that if the test manager program 235 controls the bidirectional test (as determined at step 524), at step 534 the test manager program 235 preferably checks whether the second part of the bidirectional test is complete. In response to determining that the test of the first fiber (OFLUT 408) is complete (step 534, "yes" branch), at step 536, the test manager program 235 may render the testing results to the user via, for example, the display 258 of the OTDR tool 200. The information obtained from the different parts of the bidirectional test may be combined to produce a single result; that is, a single composite OTDR trace and/or single event table in which each event is measured using the acquisition that was performed with the smallest pulse possible (i.e. the acquisition that provides a sufficient SNR to perform loss/location/reflectance measurements within a target accuracy). After displaying the results of the first fiber test, the test manager program 235 preferably displays identifications of a second fiber set to be tested. For example, the second fiber set may include just the second fiber 302 shown in FIG. 3. The test manager program 235 may instead decide to retest the first fiber set, according to some predetermined criteria. The predetermined criteria may indicate, for example, that all OFLUTs should be retested until they pass the corresponding test. According to an embodiment of the present invention, the test manager program 235 may repeat steps 504-536 for each fiber contained in the fiber optic cable subjected to the OTDR test.

In summary, the OTDR testing method described above enables a user to control the test of a plurality of fiber optic sets by reconnecting the OTDR instrument 200 to the plurality of fibers without any required interaction with the OTDR instrument between each test.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for testing the operation of an optical fiber cable in a communication network using an optical time domain reflectometer (OTDR) instrument, the method comprising the steps of:
   receiving a range of identifiers of fiber sets to be tested, wherein each of the fiber sets comprises one or more fibers and the fiber sets to be tested include a first fiber set and a second fiber set;
   selecting from the range of identifiers at least one identifier that identifies the first fiber set;
   displaying the selected at least one identifier that identifies the first fiber set, wherein the selected at least one identifier is included in the range of identifiers;
   determining whether the first fiber set is connected to the OTDR instrument;
   performing a test of the first fiber set that is identified by the selected at least one identifier using the OTDR instrument, in response to determining that the first fiber set is connected to the OTDR instrument;
   selecting from the range of identifiers a second at least one identifier that identifies the second fiber set in order to perform a test on the second fiber set that is identified by the selected at least one identifier; and
   displaying the selected second at least one identifier.

2. The method of claim 1, further comprising providing results of the performed test to a user.

3. The method of claim 1, wherein the range of identifiers of fiber sets to be tested comprises a range of identifiers of fiber sets predetermined to be retested.

4. The method of claim 1, wherein the step of determining whether the first fiber set is connected to the OTDR instrument comprises sending a plurality of optical probe signals into the first fiber set.

5. The method of claim 1, further comprising providing a summary of a plurality of detected events in the first fiber set, in response to determining that the first fiber set has not been connected to the instrument.

6. The method of claim 1, further comprising providing a summary of a plurality of detected events in the first fiber set, in response to determining that a launch fiber or a receive fiber has not been connected to the instrument.

7. The method of claim 1, wherein the step of determining whether the first fiber set is connected to the instrument comprises detecting whether a launch fiber is connected to a first end of the first fiber set and detecting whether a receive fiber is connected to a second end of the first fiber set, the second end opposite to the first end.

8. The method of claim 1, further comprising displaying one or more test parameters prior to the step of preforming the test.

9. The method of claim 7, wherein the test comprises a bidirectional test and wherein the step of performing the test comprises:
   performing the test of the first fiber set using the OTDR instrument in a first direction;
   determining whether the first fiber set has been reconnected to at least one of the launch and receive fibers at the opposite end; and
   performing the test of the first fiber set using the OTDR instrument in a second direction, opposite to the first direction.

10. A computer program product for testing the operation of an optical fiber cable in a communication network using an optical time domain reflectometer (OTDR) instrument, the computer program product comprising:
    one or more non-transitory or computer-readable storage devices and a plurality of program instructions stored on at least one of the one or more computer-readable storage devices, the plurality of program instructions comprising:
    program instructions to receive a range of identifiers of fiber sets to be tested, wherein each of the fiber sets comprises one or more fibers and the fiber sets to be tested include a first fiber set and a second fiber set;
    program instructions to select from the range of identifiers at least one identifier that identifies the first fiber set;
    program instructions to display the selected at least one identifier that identifies the first fiber set, wherein the selected at least one identifier is included in the range of identifiers;
    program instructions to determine whether the first fiber set is connected to the OTDR instrument;
    program instructions to perform a test of the first fiber set that is identified by the selected at least one identifier, in response to determining that the first fiber set is connected to the OTDR instrument;
    program instructions to select from the range of identifiers a second at least one identifier that identifies the second fiber set in order to perform a test on the second fiber set that is identified by the selected at least one identifier; and
    program instructions to display the selected second at least one identifier.

11. The computer program product of claim 10, further comprising program instructions to provide results of the performed test to a user.

12. The computer program product of claim 10, wherein the range of identifiers of fiber sets to be tested comprises a range of identifiers of fiber sets predetermined to be retested.

13. The computer program product of claim 10, wherein the program instructions to determine whether the first fiber set is connected to the OTDR instrument comprise program instructions to send a plurality of optical probe signals into the first fiber set.

14. The computer program product of claim 10, further comprising program instructions to provide a summary of a plurality of detected events in the first fiber set, in response to determining that the first fiber set has not been connected to the instrument.

15. The computer program product of claim 10, further comprising program instructions to provide a summary of a plurality of detected events in the first fiber set, in response to determining that a launch fiber or a receive fiber has not been connected to the instrument.

16. The computer program product of claim 10, wherein the program instructions to determine whether the first fiber set is connected to the instrument comprise program instructions to detect whether a launch fiber is connected to a first end of the first fiber set and detect whether a receive fiber is connected to a second end of the first fiber set, the second end opposite to the first end.

17. The computer program product of claim 10, further comprising program instructions to display one or more test parameters.

18. The computer program product of claim 16, wherein the test comprises a bidirectional test and wherein the program instructions to perform the test comprise:
   program instructions to perform the test of the first fiber set in a first direction;
   program instructions to determine whether the first fiber set has been reconnected to at least one of the launch and receive fibers at the opposite end; and
   program instructions to perform the test of the first fiber set in a second direction, opposite to the first direction.

* * * * *